Dec. 7, 1937.  F. Y. TAKENAGA  2,101,352
DEHYDRATOR
Original Filed Oct. 30, 1933
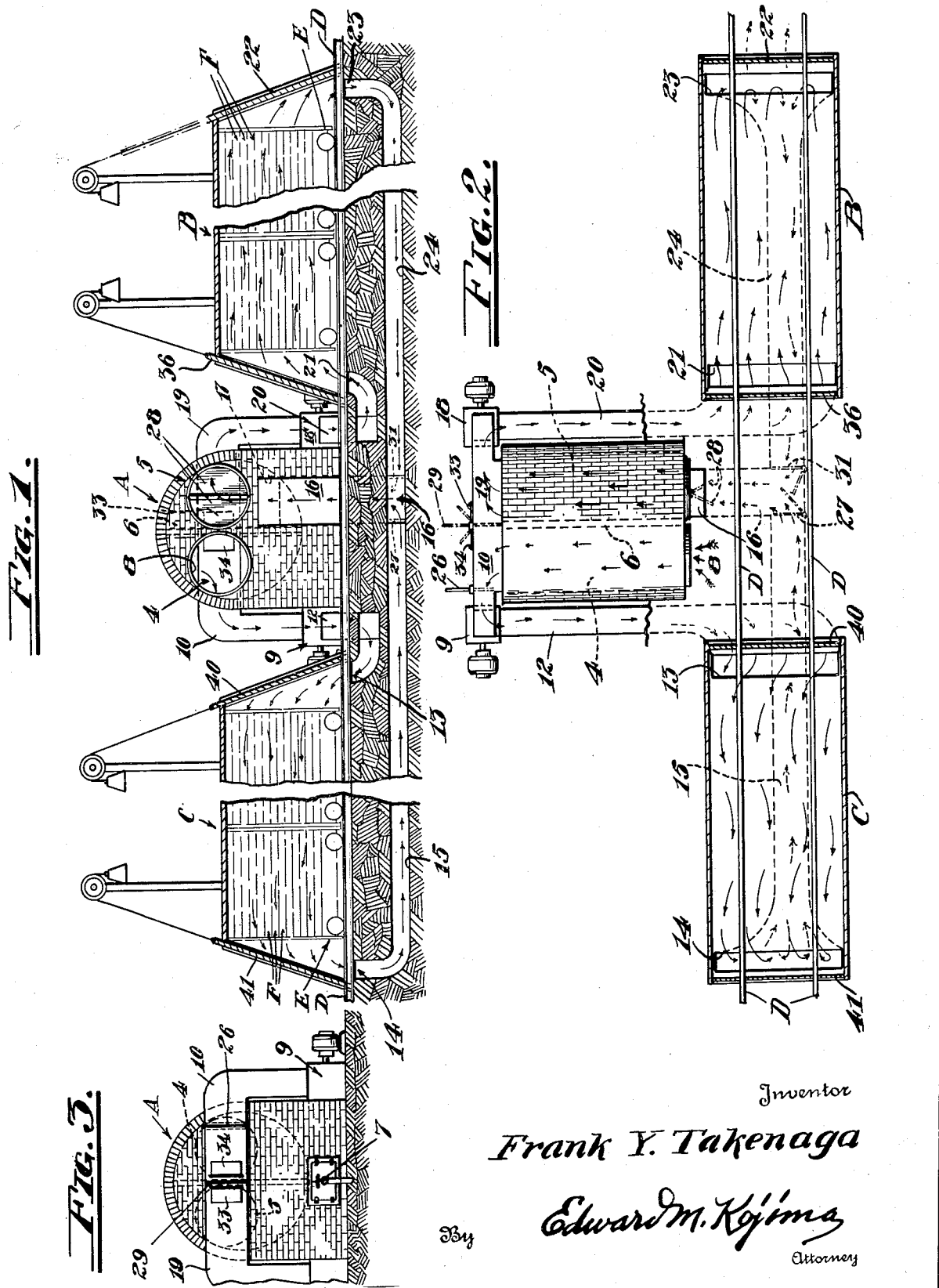
Inventor
Frank Y. Takenaga
By Edward M. Kojima
Attorney Patented Dec. 7, 1937

2,101,352

UNITED STATES PATENT OFFICE 2,101,352

DEHYDRATOR

Frank Y. Takenaga, Anaheim, Calif.

Refiled for abandoned application Serial No. 695,877, October 30, 1933. This application April 16, 1935, Serial No. 16,704

5 Claims. (Cl. 34—19)

This invention resides in the provision of a dehydrator which is especially designed for drying and treating chili peppers and similar "hollow" fruits and vegetables.

This application is refiled for abandoned application Serial No. 695,877 filed Oct. 30, 1933.

The market value of dried chili peppers is determined by the color and texture of the skin exteriorly and interiorly thereof as well as by ascertaining whether or not the interiors, particularly the cone like inner extensions from the stem ends of the peppers, are thoroughly dry. Those of the dried peppers having a uniform deep red color and a uniform skin texture inside and out as well as thoroughly dry interiors are classed as first grade and it should be noted that in grading a batch of dried peppers more than fifteen grades are usually made whereby it is apparent that but a small percentage of a given lot of peppers cured under methods heretofore used are of first quality.

In the dehydrating of chili peppers with dehydrators such as heretofore available, difficulties affecting the preserving qualities, appearance and market value of the finished product are often encountered. These difficulties result from attempting to effect complete dehydration in a single chamber where the peppers are maintained for such length of time as estimated sufficient to bring about the desired cure. Under such treatment the exteriors of the peppers are often overcured with the result of objectionable shriveling and discoloration thereof, the peppers often turning a dark brown or black color and lacking uniformity both as to color and texture, whereas the interiors are often undercured, particularly at the cone line inner extensions from the stem ends. Where the interiors are undercured, the preserving qualities of the peppers are impaired and not infrequently the peppers will spoil or mold, the mold often showing exteriorly of the peppers. Further, the interiors often develop an undesirable rough uneven texture.

The primary object of this invention is to provide a dehydrator and method of dehydrating which will eliminate the objections and uncertainties hereinbefore noted and as often encountered in the dry curing of chili peppers and like hollow fruits and vegetables, to the end that a materially greater yield of first quality dried peppers will be obtained and an appreciable saving therefore.

Another object is to provide a dehydrator such as described which may also be efficaciously employed for dehydrating fruits, vegetables and foods other than those hereinbefore noted.

A further object is to provide a dehydrator which is characterized by a plurality of independent drying or dehydrating chambers which may be used singly or collectively in various ways to best suit the particular fruits or vegetables being treated, and which is subject to a novel heat control and to continuous operation in a most efficient manner.

The invention possesses other objects and features of advantage, some of which, with the foregoing will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Fig. 1 is a fragmentary longitudinal semi-schematic sectional view of a dehydrator constructed in accordance with this invention;

Fig. 2 is a view of schematic nature showing the apparatus of Fig. 1 in top plan and in section;

Fig. 3 is an end elevation of the air heater showing the end thereof opposite that revealed in Fig. 1.

The present embodiment of the invention as shown in detail in the accompanying drawing generally comprises an air heating furnace A, supplying heated air to independent dehydrating chambers B and C, a track D extending through both chambers, and cars E for supporting drying trays F, it being noted that the chambers are spaced apart sufficiently to permit one of the cars E to move out of one chamber and stand on the track exposed to the atmosphere, from which point the car may be moved into the other chamber.

The two chambers are provided in order that different drying effects may be independently or simultaneously obtained, it being desirable to produce a greater heat in one chamber than in the other whereby the chili peppers or the like may be subjected to a two stage treatment.

As here shown, chamber B is arranged to be heated to a greater temperature than chamber C and the peppers are first treated in chamber B and then in chamber C. The object is to subject the green and comparatively moist peppers to the higher heat of chamber B to effect a substantial dehydration thereof but to remove the peppers and subject them to the more moderate temperature of chamber C to complete the dehydration thereof gradually and thoroughly under a heat which will not produce the hereinbefore noted shriveling and discoloration objections.

The air heater A may be of any suitable type provided as here shown it has air heating compartments 4 and 5 separated by a partition 6 and heated by a burner means indicated at 7. Referring to heater compartment 4 it is seen that atmospheric air may enter it at the intake opening 8 and under action of a motor driven blower 9 be heated in transit through said compartment into duct 10 thence through said blower, duct 12 and into the chamber C through chamber intake opening 13. The heated air then passes through chamber C, out discharge opening 14, ducts 15 and 16 and enters compartment 5 through intake opening 17. The preheated air thus delivered to compartment 5 is there superheated and by the action of a blower 18 is drawn through duct 19 and forced through duct 20 and intake 21 into chamber B. The heated air in chamber B may be vented to the atmosphere by raising the counterbalanced door 22 or may be drawn through outlet opening 23, duct 24 into duct 16 and back into compartment 5 of the heater, depending on the conditions to be met and the temperatures desired. Heated air returned to compartment 5 from chamber B is again heated and returned to chamber B as a comparatively hot air stream.

To provide for use of chamber B only, as for example when the dehydrating operation is commenced, a slide door 26 in the duct 10 is closed and a door 27 at the juncture of ducts 15 and 16 is likewise closed. At the start of this operation, blower 18 only is operated and doors 28 controlling atmospheric air intake into compartment 5 are opened as is also the slide door 29 between ducts 10 and 19. Atmospheric air is then drawn into both heating compartments 4 and 5 where it is heated and then passes through communicating ducts 10 and 19 into the blower 18 and from thence through duct 20 and intake 21 into chamber B, then through outlet 23, ducts 24 and 16 and back into chamber 5 where the air stream is reheated and again forced through chamber B.

If it is desired to discharge the heated air into the atmosphere from the outer end of chamber B then the door 31 at the juncture of ducts 24 and 16 is closed and door 22 is raised.

Dampers 33 at the outer end of the heater provide for introduction of atmospheric air at that point whereby to regulate the temperature of the circulated hot air stream forced through the system.

*Operation*

In starting a dehydrating operation cars E loaded with trays F of green chili peppers are moved on track D into chamber B the counterbalanced door 22 being raised, whereas the counterbalanced door 36 is closed. The door 22 is then closed as also are the doors 26 and 27, whereas doors 28, 29 and 31 are opened. Upon now starting the burner 7 and blower 18, atmospheric air will be drawn into both compartments 4 and 5 and there heated. From these compartments the heated air streams are drawn through ducts 10 and 16, blower 18 and forced through duct 20 and opening 21 into chamber B. It is noted that the doors 36 and 22 are slanted to act as baffles, the door 36 deflecting the incoming hot air stream laterally towards the trays of peppers and the door 22 deflecting the stream downward towards its lower edge and towards outlet opening 23.

It is apparent that the hot air stream circulated through chamber B will pass over and between the trays F and thereby effect the desired dehydrating action. At the start of dehydration, the door 22 is kept closed and the air stream is then drawn through outlet 23, duct 24, duct 16 and back into heater compartment 5 whereby the air streams then discharged into chamber B will be of high temperature and provide for the first dehydration step in accordance with the present method.

The temperature of the hot air stream forced in chamber B may be regulated by manipulation of the dampers 33, or by closing door 31 and opening door 22 to the atmosphere, or by closing doors 28, 29 and 31 and opening doors 26 and 27. In the latter case, the blower 9 is brought in operation and the air heated in compartment 4 is circulated as hereinbefore explained through chamber C and then into compartment 5, from thence it is forced through chamber B.

To prepare chamber C for the gradual finishing treatment of the peppers, before the first treatment in chamber B is completed, the operator closes doors 28 and 31 and opens doors 26, 27 and 29 and starts blower 9 to circulate heated air as hereinbefore explained first through chamber C and then in heater compartment 5 and from there into chamber C.

It should be noted that before the first treatment of a batch of peppers is completed and the cars are run into chamber C for the finishing treatment, then the apparatus may be operated continuously, as next above noted, to circulate air through chamber C first and then reheat said air whereby to send an air stream of higher temperature continuously through the first stage chamber B. In this way the two treatments are carried on simultaneously in independent chambers with but a single air heater unit.

The operator by raising door 36 may have access to the interior of chamber B whereby to inspect the peppers to ascertain the extent of treatment. When treated to the desired extent, the cars are moved from chamber B along track D into the open space between the two chambers and are thus exposed to the atmosphere purposely for such length of time as estimated desirable by the operator.

This exposure of the peppers between the two treatments thereof has been found desirable as the color and skin texture may be gauged by such treatment. After this exposure treatment the door 40 is raised and the cars are rolled into chamber C for the finishing treatment, the door 41 at the other end of chamber C being closed. These doors 40 and 41 are slanted and act as baffles in the same manner as doors 22 and 36. After the finishing treatment the cars of peppers are rolled out of chamber C and the peppers may then be removed and packed or stored.

It is important to note that the method hereof provides for subjecting the green peppers, vegetables or fruits as the case may be to partial dehydration by circulating a relatively hot air stream through a dehydrating chamber, then moving the partially dehydrated peppers out of the dehydrating zone into an atmosphere zone, then moving the peppers into a finishing chamber and causing a more gradual dehydrating action by circulating an air stream of lesser heat through said finishing chamber. Further it is important to note that these separate treatments may be carried on simultaneously and the entire apparatus continuously operated to effect the three stage treatments as above noted in a most economical and efficient manner.

I claim:

1. In a dehydrator, independent dehydrating chambers having open ends, and heated air intake and discharge openings with the latter located at the lower side of said chambers adjacent said ends, doors at said ends being inclined and disposed to deflect the air streams entering and discharging from said chambers, an air heater, and means for circulating hot air streams through said chambers either through one chamber back to the heater and from thence through the other chamber or through the last named chamber only.

2. In a dehydrator, independent dehydrating chambers being open at both ends, closures for said open ends, an air heater located to one side of and between said chambers having primary and secondary compartments each having an atmospheric air intake opening and a heated air outlet, the secondary compartment having a hot air intake opening, conduits leading from the heated air outlets of said compartments to and opening through the floors of said chambers, conduits leading from the floors of said chambers to the hot air intake of the secondary compartment, and blower means for circulating heated air thru said chambers, conduits and compartments.

3. In a dehydrator, independent dehydrating chambers being open at both ends, closures for said open ends, an air heater located to one side of and between said chambers having primary and secondary compartments each having an atmospheric air intake opening and a heated air outlet, the secondary compartment having a hot air intake opening, conduits leading from the heated air outlets of said compartments to said chambers, conduits leading from the said chambers to the hot air intake of the secondary compartment, blower means for circulating heated air thru said chambers, conduits and compartments, and means controlling the atmospheric air intake of said secondary compartment, said chambers having floor openings at respective ends thereof and with which said conduits are connected.

4. In a dehydrator, independent dehydrating chambers being open at both ends, closures for said open ends, an air heater located to one side of and between said chambers having primary and secondary compartments each having an atmospheric air intake opening and a heated air outlet, the secondary compartment having a hot air intake opening, conduits leading from the heated air outlets of said compartments to said chambers, conduits leading from the said chambers to the hot air intake of the secondary compartment, blower means for circulating heated air thru said chambers, conduits and compartments, means controlling the atmospheric air intake of said secondary compartment, and valve means operable to control communication of the last named conduits with said hot air intake to provide for opening or closing either one or both of said conduits, said chambers having floor openings communicated with said conduits.

5. In a dehydrator, independent dehydrating chambers being alined with each other and spaced apart sufficient to permit a unit of material being treated thereby to stand therebetween exposed to the atmosphere, said chambers being open at both ends, a track extending thru between said chambers, said chambers having hot air discharge and intake openings adjacent the ends and at the lower side thereof, doors for said open ends, an air heater comprised of primary and secondary heating compartments, said heater being located to one side of and midway between said chambers, separate conduits for conducting heated air to said chambers from said compartments, independent conduits for returning heated air from said chambers to the secondary only of said compartments, valve means operable to shut off the return of air from either one or both of said last named conduits, means for forcing a circulation of the heated air throughout the compartments, conduits and chambers, said primary heating compartment having an open atmospheric air intake, said secondary compartment having an atmospheric air intake, and a valve controlling the latter intake.

FRANK Y. TAKENAGA.